Figure 3:
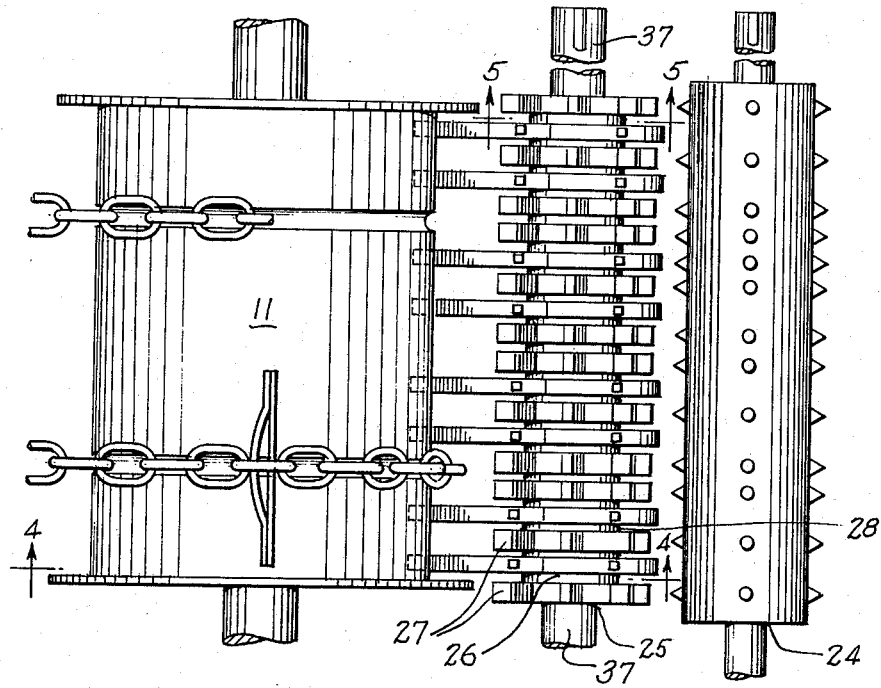

Sept. 27, 1955
G. M. STANDAL
2,718,960
SPIKE ROLL FOR A CONVEYOR
Filed July 16, 1954
2 Sheets-Sheet 1
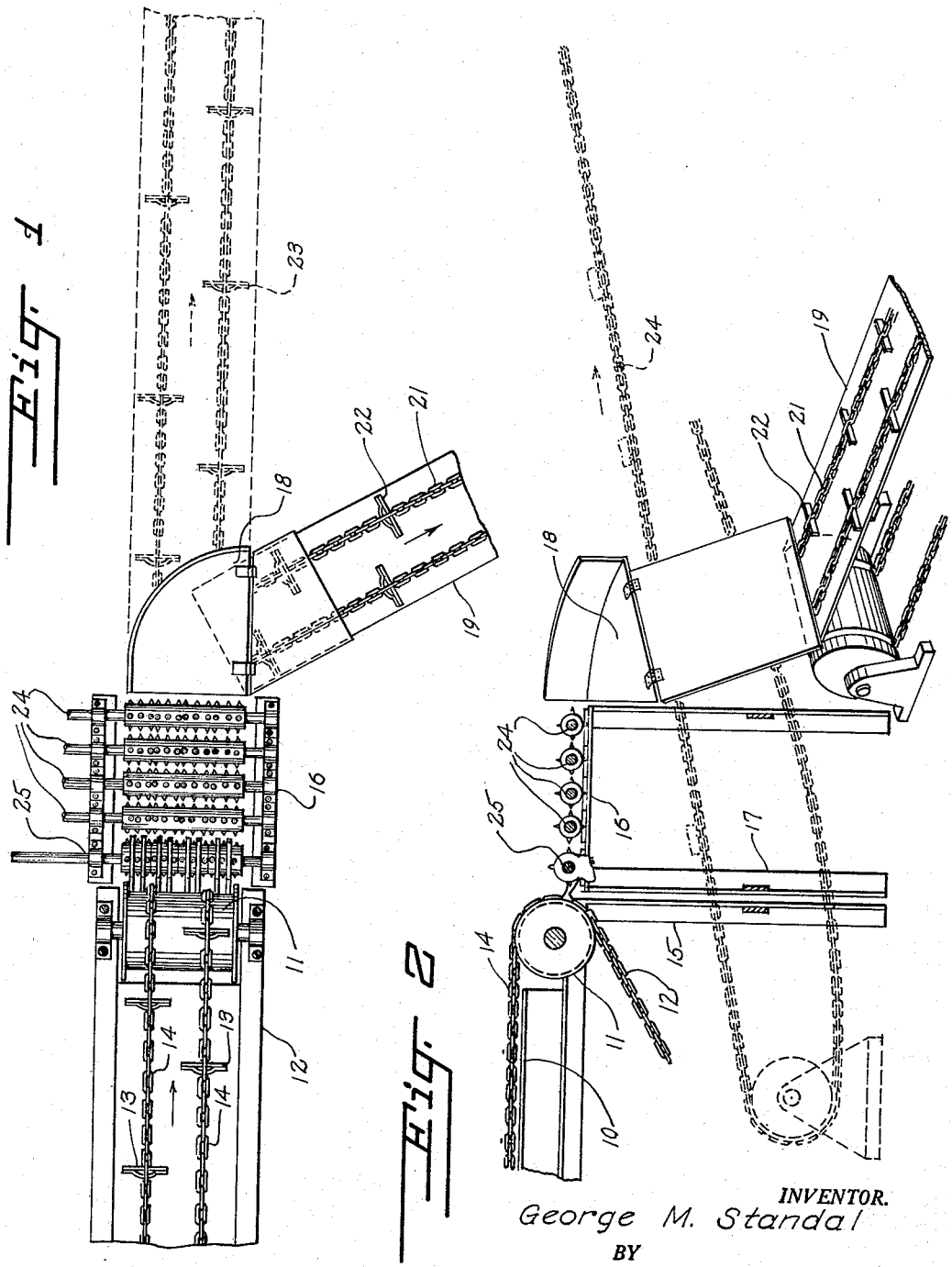
INVENTOR.
George M. Standal
BY
McMorrow, Berman + Davidson
ATTORNEYS Sept. 27, 1955  G. M. STANDAL  2,718,960
SPIKE ROLL FOR A CONVEYOR
Filed July 16, 1954  2 Sheets-Sheet 2

INVENTOR.
George M. Standal
BY
McMorrow, Berman & Davidson
ATTORNEYS

United States Patent Office 2,718,960
Patented Sept. 27, 1955

2,718,960

SPIKE ROLL FOR A CONVEYOR

George M. Standal, Chemainus, British Columbia, Canada

Application July 16, 1954, Serial No. 443,943

3 Claims. (Cl. 198—105)

The present invention relates generally to conveyors for lumber mills and specifically to a spike roll of particular design for conveying wood known as chip wood to a point of processing of the wood before feeding it to the chipper.

In the process of sawing logs into usable wood shapes and pieces termed rough lumber, the sawyer and his crew must take many preliminary cuts along the log sides to get square faces, before taking straight cuts to produce boards and planks. Much of the slab pieces have little or no bark on them and are suitable for feeding to the chipper which produces chip wood for the digesters of pulp plants. Chip wood is salable for much more than the value of the remaining wood slabs which have a high percentage of bark, knots and other defects which designate this material as only fit for the boiler house or "hog plant" as fuel for the boilers.

However, much of the chip wood has embedded gravel in it and other foreign debris and is therefore fed automatically to the spike rolls which shake and jar most of the debris loose, to fall on the conveyor which feeds the "hog plant" along with small pieces which go through the spaces between the spike rolls, of which there are several in succeeding positions as in a conveyor itself.

The spike rolls are mainly constructed of 10 inch diameter shafts or pipe with star-shaped projections which engage the wood and turn it. Frequently the adjacent rolls turn at calculated and different speeds, and toss and turn the wood in great jarring movements. The first spike roll adjacent the discharge end of the conveyor may not be placed any closer to the end drum of the conveyor than about eight inches on any conveyor which has cleat members secured to one or more chains, the cleat members being the means by which the wood slabs and pieces are carried upwardly to the point of separation of the chip wood from the "hog plant" wood. This gap of eight or more inches permits good chip wood to fall on the lower conveyor leading to the "hog plant" and has heretofore required the services of laborers to remove the chip wood from the fuel wood.

The present invention has for its principal object therefore to provide a device which normally closes this gap between the first of a series of spike rolls and the end drum of a chain conveyor and one which permits the cleat members of the conveyor to pass on the drum for the return run while preventing the passage of wood through the same space and at the same time feeding the wood along to the next spike roll.

Another object of the present invention is to provide such a device which in itself is a specialized type of spike roll and serves as such while performing otherwise as stated.

A further object of the present invention is to provide a spike roll of simple construction of ordinary materials easily cast and machined, and one which is easily assembled and maintained in the sawmill maintenance department.

A still further object of the present invention is to provide a spike roll which is foolproof in action and one which is automatic and requires no attention other than the usual oiling or greasing common to most sawmill equipment.

Figure 4:
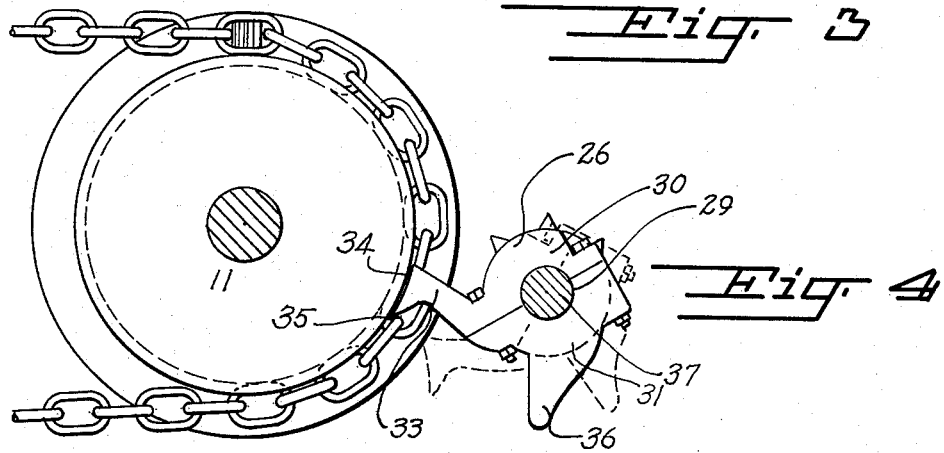
Figure 5:
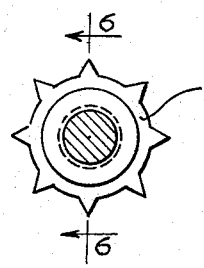
Figure 6:
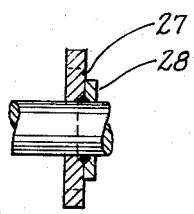

These and other objects and advantages will be fully apparent from the following description when considered in connection with the annexed drawings, in which:

Figure 1 is a top plan view of the conveyors and spike rolls in their operative positions, Figure 2 is a side view in elevation of the conveyors and the rolls of Figure 1, Figure 3 is a top plan view of the spike roll of this invention showing its location relative to the end drum of the conveyor and to the next succeeding spike roll, Figure 4 is a side view in section taken on line 4—4 of Figure 3, Figure 5 is a plan view in elevation of a single star-shaped wheel of the spike roll of the present invention, and Figure 6 is a view partly in cross section showing a star-shaped wheel and a spacer disc used between each wheel and its adjacent element of the invention.

Referring in more detail to the drawing, in which like numerals indicate like parts throughout the several views, it will be seen in Figures 1 and 2 the general plan view of a conveyor 10 having an end drum 11 and a return run 12 with cleat members 13 secured crosswise on the chains 14. Supports generally indicated at 15 support the discharge end of the conveyor 10 at a convenient height above the spike roll assembly indicated generally at 16, supported by the frame 17 and provided with the end table 18 which discharges to another conveyor 19 having similar chains 21 and cleat members 22.

In dotted lines in Figures 1 and 2 is indicated a third conveyor system 23, leading to the "hog plant" of the sawmill, and on which falls the debris and wood bark knocked from the wood as it is passed over the spike roll assembly 16 here shown as having four conventional spike rolls 24 and the spike roll of this invention indicated at 25.

In Figures 3 and 4 it will be seen that a gap must exist between any spike roll that is nearest to the conveyer drum 11, and that there must be room for the cleat members to pass therethrough on the return run. The present invention is therefore seen in these figures to consist of the bodies 26 and star-shaped wheels 27 with spacers 28 positioned on each side of each wheel 27. The body 26 is composed of a hub portion 29, made in two pieces 30 and 31 secured together by bolts 32, the former piece 30 being provided with an outwardly extending finger 33 having at its free end the arcuately curved contact face 34 which is normally in rubbing contact with the surface of the drum 11 and is sized in arcuate length so as to be prevented from passing upwardly above the point of contact on the drum, the toe 35 preventing such upward movement.

The latter piece 31 of the hub portion 29 is formed with counterbalance portion 36 which may be weighted with an insert of lead or otherwise formed of a heavier mass than the finger 33 so that the finger is normally extended outwardly to the drum 11 and is swingably mounted on the shaft 37 to which are welded the wheels 27, with the spacers 28 undercut on their one face, as in Figure 6 to avoid the weld material which may protrude.

In Figure 4 in dotted lines is shown the position which is assumed by the finger 33, one or more of them when a cleat member passes, it being understood that other fingers are not moved if not in abutment relation with the cleat member and that chip wood will be conveyed by all fingers in normal position to the star-shaped wheels which form a spike roll and which pass the chip wood along to the other spike rolls and to the end table, to fall to the conveyor 19 leading to the chipper, not here shown.

The operation of the device is believed to be fully apparent from the above description and the services of the laborers to sort out relatively valuable chip wood from the "hog plant" wood are largely saved by this invention, the small particles of chip wood which might pass through along with a cleat member are negligible, it being understood moreover that the conveyor 10 has operated through the lumber selection stations of the mill and that all of the usable lumber excepting chip wood and fuel has been removed by hand or other means and that the end drum of the conveyor is the tail end of the process of separating the products of the particular section of the mill.

While a single embodiment of the invention has been here shown and described, other embodiments may be made and practiced within the scope of what is claimed, without departing from the spirit of the invention.

What is claimed is:

1. The combination with a chain conveyor and a drum adjacent the discharge end of said conveyor, of a spike roll positioned at the discharge end of said conveyor and parallel to said drum, said roll comprising a rotatable shaft, star shaped wheels secured to said shaft at spaced intervals therealong and rotatable therewith, and bodies swingably mounted on said shaft one each between adjacent ones of said wheels, each of said bodies being formed with an outwardly extending finger projecting beyond the peripheries of said wheels and having a counterbalance portion on a side opposite said finger, said fingers having their free ends normally in rubbing contact with said drum and swingably movable on said shaft to permit passage of cleat members on said conveyor to pass between said spike roll thus formed and said drum while preventing passage of wood pieces therethrough and permitting said wheels to pass the wood pieces to succeeding spike rolls.

2. The combination with a chain conveyor and a drum adjacent the discharge end of said conveyor, of a spike roll positioned at the discharge end of said conveyor and parallel to said drum, said roll comprising a rotatable shaft, star shaped wheels secured to said shaft at spaced intervals therealong and rotatable therewith, and bodies swingably mounted on said shaft one each between adjacent ones of said wheels, each of said bodies being formed with an outwardly extending finger projecting beyond the peripheries of said wheels and having a counterbalance portion on a side opposite said finger, said finger being formed at its free end with an outwardly disposed arcuate contact face, said fingers having their contact faces normally in rubbing contact with said drum and swingably movable on said shaft to permit passage of cleat members on said conveyor to pass between said spike roll thus formed and said drum while preventing passage of wood pieces therethrough and permitting said wheels to pass the wood pieces to succeeding spike rolls.

3. The combination with a chain conveyor and a drum adjacent the discharge end of said conveyor, of a spike roll positioned at the discharge end of said conveyor and parallel to said drum, said roll comprising a rotatable shaft, star shaped wheels secured to said shaft at spaced intervals therealong and rotatable therewith, and bodies swingably mounted on said shaft one each between adjacent ones of said wheels, each of said bodies being formed with an outwardly extending finger projecting beyond the peripheries of said wheels and having a counterbalance portion on a side opposite said finger, said finger being formed at its free end with an outwardly disposed arcuate contact face, said fingers having their contact faces normally in rubbing contact with said drum and swingably movable on said shaft to permit passage of cleat members on said conveyor to pass between said spike roll thus formed and said drum while preventing passage of wood pieces therethrough and permitting said wheels to pass the wood pieces to succeeding spike rolls, said contact face of said fingers being dimensioned relative to the diameter of said drum so that the fingers are prevented from swinging upwardly beyond their position of rubbing contact.

No references cited.